United States Patent
Allen

[15] 3,670,891
[45] June 20, 1972

[54] MICROWAVE SEWAGE TREATMENT SYSTEM

[72] Inventor: Wallace Peyton Allen, 1447 N.W. 36th Street, Miami, Fla. 33142

[22] Filed: May 4, 1970

[21] Appl. No.: 34,279

[52] U.S. Cl............................210/128, 21/102, 210/138, 210/152
[51] Int. Cl..............................................B01d 21/24
[58] Field of Search............21/54, 102; 210/128, 255, 152, 210/258, 12, 19, 71, 187, 532, 192, 138

[56] References Cited

UNITED STATES PATENTS

| 2,709,680 | 5/1955 | Watson | 210/138 X |
| 3,537,655 | 11/1970 | Gustafson | 210/152 X |
| 3,498,457 | 3/1970 | Gough | 210/152 X |
| 1,432,124 | 10/1922 | Rudd | 21/102 X |
| 3,092,503 | 6/1963 | Gray | 21/102 X |

FOREIGN PATENTS OR APPLICATIONS

| 674,555 | 11/1963 | Canada | 21/102 |

Primary Examiner—Frank A. Spear, Jr.
Attorney—Ernest H. Schmidt

[57] ABSTRACT

A sewage treatment system using microwave electromagnetic energy to sterilize raw sewage on a continuous basis is described. A holding tank for receiving the raw sewage at an inlet port periodically discharges pre-determined amounts of sewage into a treatment tank wherein the sewage is subjected to microwave radiation of such intensity over a pre-determined time interval as will destroy bacteria not only by heat induced in the raw sewage but also by the oscillatory effects of the radiation on the organisms.

3 Claims, 3 Drawing Figures

PATENTED JUN 20 1972 3,670,891

INVENTOR.
WALLACE P. ALLEN

BY Ernest H. Schmidt
ATTORNEY.

MICROWAVE SEWAGE TREATMENT SYSTEM

This invention relates to sewage treatment and is directed particularly to a new and improved system for destroying bacteria in sewage without the use of chemicals.

The proper treatment of raw sewage to render the final effluent substantially free of harmful bacteria is becoming increasingly important as population rises. This is particularly true in urban areas, where improperly treated sewage can result in pollution of the drinking water, a serious health hazard. Heretofore, moreover, such untreated or only partially treated sewage has been discharged into rivers, streams and into the ocean along coastal areas, a water polluting practice which has been found not only to be unsightly, but also disruptive of the ecological balance in the area. Because of the widespread damage thus already done to the natural environment, it is of utmost importance that sewage be fully treated at the sewage processing plant and that the effluent discharge be sterile.

The use of chemicals in the treatment of raw sewage to kill all harmful bacteria is well known. Such chemical processes as have heretofore been devised, however, leave chemical residues in the effluent which, in themselves, adversely affect the balance of nature in the areas in which they are discharged, whether in land or water.

It is, accordingly, the principle object of this invention to provide a new and improved sewage system that obviates the above-described deficiencies of sewage treatment methods heretofore devised.

A more particular object is to provide a sewage treatment system that uses microwave radiant energy directed into the sewage for not only killing bacteria by the effect of radiation, but also by raising the sewage to such a high temperature as will additionally kill all harmful bacteria on a continuous basis to positively render the effluent sterile.

Still another object is to provide a microwave sewage treatment system of the character described which is well adapted to use in all sizes of sewage installation, whether for a single household or a whole city.

Another object is to provide a sewage system of the above nature which will be automatic in operation in the treatment of continuously flowing sewage in a sewage collection system.

Other objects, features and advantages of the invention will be apparent from the following description when read with reference to the accompanying drawings.

In the drawings, wherein like reference numerals denote corresponding parts throughout the several views.

Figure 1:
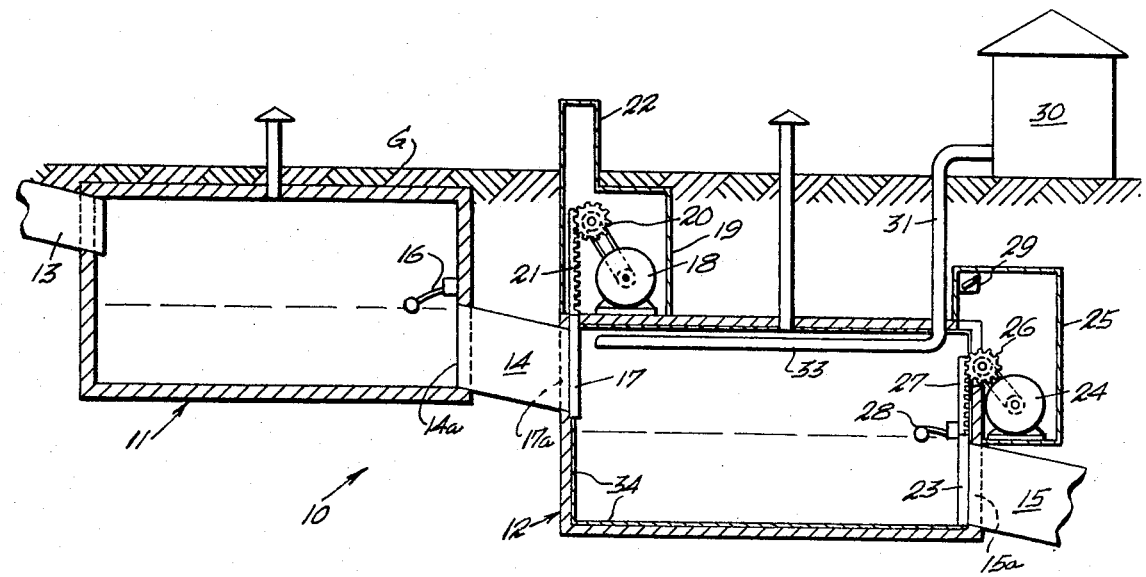
FIG. 1 is a vertical cross-sectional view illustrating an underground microwave sewage treatment system embodying the invention.

Referring now in detail to the drawings, reference numeral 10 designates, generally, a microwave sewage treatment system embodying the invention, the same being comprised of a collection tank 11 and a microwave treatment tank 12, both of which tanks are preferably located below ground level, with the treatment tank at a lower level to receive raw sewage collected in said collection tank by gravity flow, as is hereinbelow more particularly described. Raw sewage is fed into the collection tank 11 through a sewer main outfall conduit 13 leading through an upper portion at one end of the collection tank 10. An interconnecting conduit 14 communicates between an outlet opening 14a at a lower portion at the other end of the collection tank 11 and an inlet opening 17a at an upper portion of one end of the microwave treatment tank 12. Sewage treated in the treatment tank 12, as is hereinbelow described, flows through an outlet opening 15a at a lower portion of the other end of the treatment tank 12 into an effluent outfall conduit 15 for ultimate disposal.

The collection tank 11 is equipped with a raw sewage level detector 16 operative upon the sewage being discharged into said collection tank raching a certain predetermined level first to close normally open outlet gate 23 and then to lift or open a treatment tank inlet gate 17 normally closing off inlet conduit 17a to discharge the collected raw sewage in tank 11 into microwave treatment tank 12. As an example of means for opening the gate 17, an electrical motor 18 enclosed in a housing 19 above the treatment tank 12 drives a pinion gear 20 intermeshed with a rack 21 comprising a vertical extension of gate 17.

The treatment tank outlet gate 23 at the treatment tank outlet opening 15a is operated by a gate control motor 24 arranged in a motor housing 25 at the outward end of said tank. The motor 24 drives a pinion gear 26 in mesh with a rack 27 extending upwardly of the gate 23. Upon energization of the motor 18 as controlled by the raw sewage level detector 16 when the pre-determined level of raw sewage collected in collection tank 11 has been reached, rotation of pinion gear 20 will be such as to lift the gate 17 to discharge the collected amount of sewage into treatment tank 12. As described above, the gate motor 24, also controlled by the raw sewage level detector 16, will first have been energized to cause rack 27 to close gate 23 so that the raw sewage being discharged from the collection tank 11 will be contained in the treatment tank 12. Actuation of the sewage level detector 28 in treatment tank 12 energizes a microwave generator or transmitter in the structure 30 to feed microwave energy through feeder line 31 to a microwave radiator or antenna 33 arranged lengthwise within the top of the microwave treatment tank 12 at an appropriate position for maximum energy transfer. Sewage level detector 28, upon being actuated as described above, also energizes gate motor 18 in the reverse direction to close gate 17 for the next cycle of operation. In this connection it is to be noted that the motor housing 17 is provided with a vertical extension 22 accommodating the rack 21 when in its uppermost position To improve efficiency of the absorption of the radiant energy in the sewage being treated, inside walls of the treatment tank 12 will preferably be lined with layers of reflective material 34 so spaced with respect to the antenna 33 as to reflect maximum electromagnetic energy into the raw sewage. The power output of the microwave transmitter and its associated antenna 33 will be chosen so that the sewage under treatment will be raised to the maximum desired temperature in a short enough time interval permitting rapid recycling for efficiently treating large volumes of raw sewage on a continuous basis. During the cyclical intervals that discrete amounts of collected sewage are held in the treatment tank 12 as described above, the sewage is heated by microwave electrical energy to a temperature sufficiently high to kill or destroy all harmful bacteria. In addition to killing all bacteria by heat thus generated in the raw sewage, the effect of the microwave energy itself is such as will kill all germs independently of whether or not the sewage is heated to a high temperature. Thus, the sewage is subjected to microwave electromagnetic energy of such wave length as will kill all germs by electromagnetic bombardment without necessarily raising the raw sewage under treatment to a high temperature.

After completion of the microwave treatment, as controlled by a timing device (not illustrated) started by actuation of the level detector 28 as described above, said timing device is operative to reversely energize the outlet gate motor 24 to raise gate 23 and thereby open outlet opening 15a to discharge the treated sewage as a sterile effluent through the outfall conduit 15. Upon the gate rack 27 reaching its uppermost position, it will actuate a limit switch 29 serving to de-energize the associated gate drive motor 24, leaving the gate up in readiness for the next cycle of operation initiated by the volume of raw sewage being collected in the collection tank 11 again reaching its level detector 16.

Figure 2:
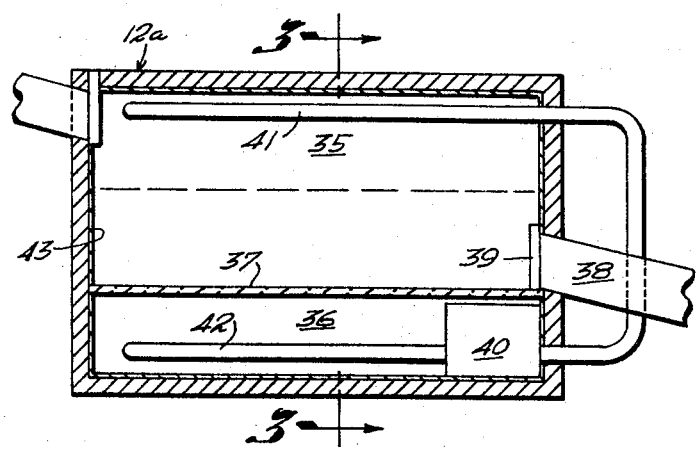
FIG. 2 is a vertical cross-sectional view of an alternate form of treatment tank comprising the system illustrated in FIG. 1.
Figure 3:
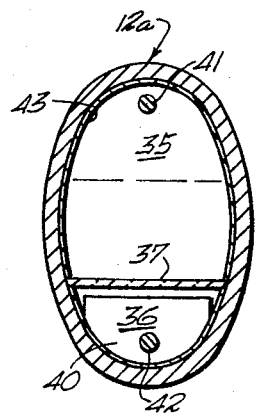
FIG. 3 is a vertical cross-sectional view taken along the line 3—3 of FIG. 2 in the direction of the arrows and illustrating mechanical details of the treatment tank.

FIG. 2 illustrates a modified form of microwave treatment tank 12a differing from the treatment tank 12 illustrated in FIG. 1 described above principally in that the tank is substantially oval in cross-sectional shape, as illustrated in FIG. 3, and in that it is divided into separate upper and lower chambers 35 and 36, respectively, by a horizontal partition 37 for reasons hereinbelow more particularly described. As illustrated in FIGS. 2 and 3, the upper tank chamber 35 is used for holding for treatment sewage collected in the associated collection tank (not illustrated in FIG. 2), in the manner hereinabove described in connection with the operation of the system of FIG. 1. Upon completion of a sewage treatment cycle, the treated effluent will be discharged through an effluent outlet conduit 38 as controlled by a tank outlet gate 39, only schematically indicated in FIG. 2, but which may be similar in construction and operation to the outlet gate 23 of FIG. 1. The dividing partition 37 of the treatment tank 12a is of a dielectric material of a quality keeping absorption of the microwave energy to a minimum while at the same time being strong enough and impervious to support the sewage in the upper chamber 35 being treated without leakage into the lower chamber 36. The radiant energy oscillator or transmitter 40 can conveniently be located in the lower tank chamber 36, near the outfall end thereof, to feed upper and lower longitudinally-extending energy radiating antennas 41, 42, respectively, above and below the sewage to be treated. With reference to FIG. 3, it is to be particularly noted that the upper and lower tank chambers 35 and 36 are substantially parabolic in cross-sectional shape in that the radiating antennas extend along lines substantially coincident with the respective foci of said parabolic surfaces. The parabolic interior tank surfaces moreover are coated or layered with an energy reflecting medium 43, and the size of the tank chambers are such that for the particular frequency or frequency range of radiant energy selected the distance between the radiating antennas 41 and 42 and the vertical center of the treatment tank will be such that maximum energy will be absorbed in the raw sewage under treatment. In this connection, it will be noted that the partition 37 is so placed that when the treatment tank is filled to its treatment capacity, as illustrated by the broken line in FIGS. 2 and 3, the volume of sewage bill be substantially centrally located with respect to the radiating antennas 41 and 42.

With such construction and operation, maximum efficiency of conversion of radiant energy from the antennas 41 and 42 into bacteria-destroying energy is in the sewage under treatment is attained.

While I have illustrated and described herein only two forms in which my invention can conveniently be embodied in practice, it is to be understood that these forms are given by way of example only and not in a limiting sense. The invention, in brief, comprises all the embodiments and modifications coming within the scope and spirit of the following claims.

What I claim as new and desire to secure by Letters Patent is:

1. A microwave sewage treatment system comprising, in combination, a treatment tank, means for periodically supplying predetermined discrete amounts of sewage into said treatment tank for predetermined intervals, a source of microwave radio frequency energy, microwave radio frequency radiating means energized by said source of microwave radio frequency energy, said microwave radio frequency radiating means being operative to direct microwave radio frequency energy into the sewage being held in said treatment tank for killing bacteria therein, a horizontally-extending dielectric partition in said treatment tank for supporting the sewage therein at a central vertical zone within said tank, said microwave radiating means comprising a pair of elongated radiating antennas within said tank, one above and the other below said sewage zone, and means for reflecting radiant energy from said radiating antennas into said sewage zone for maximum energy absorption therein.

2. A microwave sewage treatment system as defined in claim 1, wherein said upper and lower antennas extend longitudinally in spaced relation above and below, respectively, said sewage zone, and wherein said reflecting means comprises substantially parabolic electromagnetic wave reflecting surfaces.

3. A microwave sewage treatment system as defined in claim 2, wherein said source of microwave energy comprises a microwave oscillator located within said treatment tank.

* * * * *